UNITED STATES PATENT OFFICE.

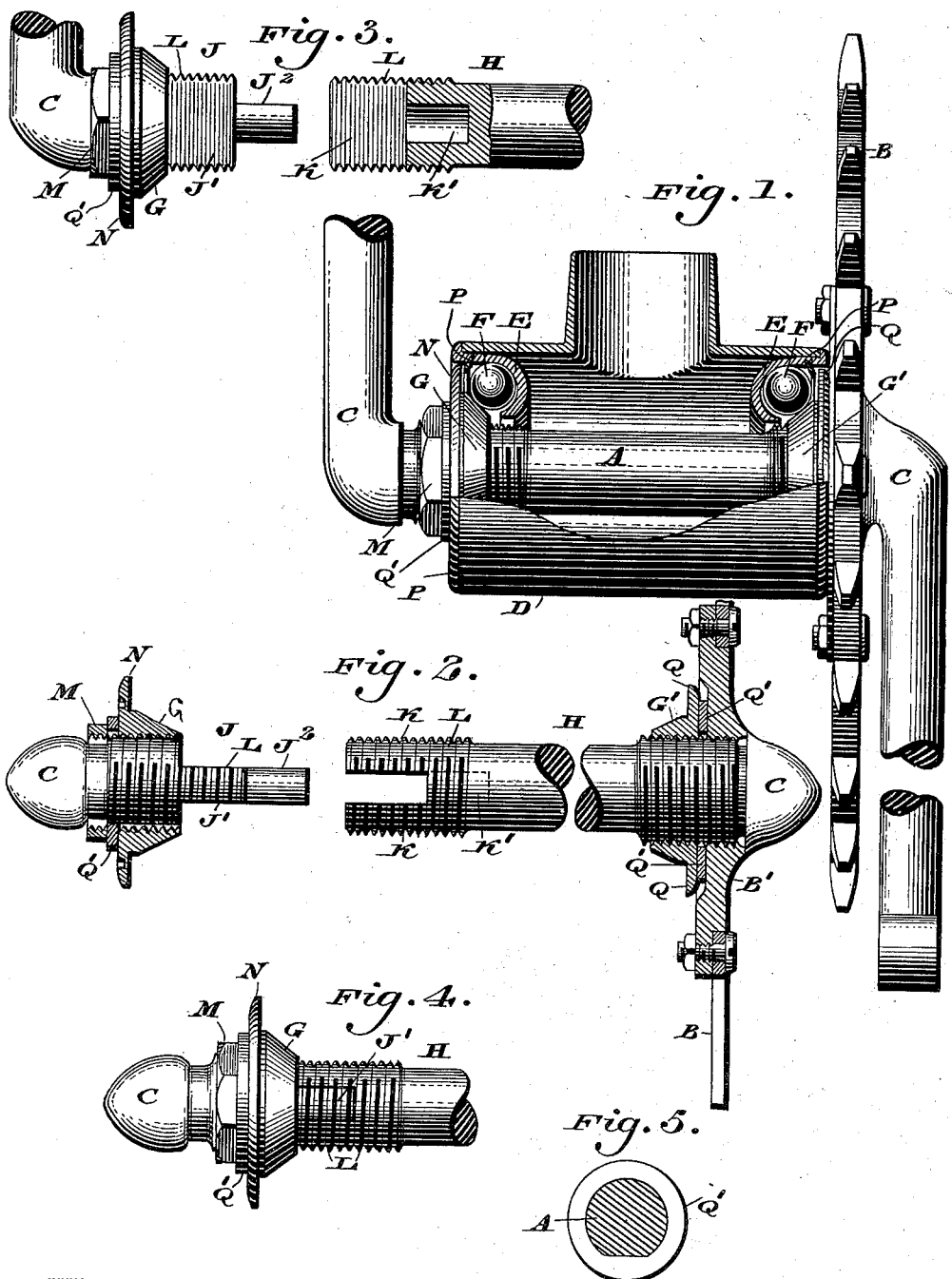

HENRY M. KOLB AND CHARLES FOEHL, OF PHILADELPHIA, PENNSYLVANIA.

PEDAL-CRANK CONNECTION FOR BICYCLES, &c.

SPECIFICATION forming part of Letters Patent No. 625,038, dated May 16, 1899.

Application filed September 13, 1897. Serial No. 651,452. (No model.)

*To all whom it may concern:*

Be it known that we, HENRY M. KOLB and CHARLES FOEHL, citizens of the United States, residing in the city and county of Philadelphia, State of Pennsylvania, have invented a new and useful Improvement in Pedal-Crank Connections for Bicycles or other Vehicles, which improvement is fully set forth in the following specification and accompanying drawings.

Our invention consists of the construction of a pedal-crank connection or hanger for a bicycle or other vehicle, whereby the parts of the same may be readily placed in operative position and removed therefrom when so desired and ball-bearings are provided at desired places for rendering the operation of the pedal-shaft, and consequently of the pedals, in an easy and quick manner, said shaft being formed in sections, one of which is provided with a bifurcation and the other section with a tongue, the surfaces of said bifurcation and tongue being coincidently screw-threaded for the engagement of a nut or screw-threaded cone, which practically connects the bifurcation and tongue as one. One of the sections is furthermore provided with a longitudinally-extending tenon and the opposite section with a longitudinally-extending mortise, said tenon entering said mortise, and thereby strengthening the connection of the sections beyond the places of location of the tongue and bifurcation.

Figure 1 represents a longitudinal section of a pedal-crank connection or hanger embodying our invention. The remaining figures represent views of detached portions thereof.

Similar letters of reference indicate corresponding parts in the figures.

Referring to the drawings, A designates a shaft having the sprocket-wheel B and pedal-arms C thereon.

D designates a box or crank-hanger, which is supported in a suitable manner on the proper part of the frame of a bicycle and has within the same, at opposite ends thereof, the circular cups E, which receive portions of the ball-bearings F F′, the latter also contacting with the respective cones G G′ on the shaft A, the central openings of said cones and the adjacent portions of the shaft A being screw-threaded, whereby said cones may be properly adjusted or set in position.

The shaft A is divided or formed into sections H and J, the section H having a bifurcation K and the recess or mortise K′ at the base of the latter extending into the solid portion of said shaft A. The section J has a flat portion or tongue J′, which enters the slot of said bifurcation K, and the dowel or tenon J², which enters said recess K′. The exteriors of the sections H and J at their place of junction are screw-threaded, as at L, the threads being continuous of each other and adapted to be engaged by the cone G and nut M, whereby when said cone is in position the nut M is tightened against the same, thus holding the cone firmly in position and connecting the sections H J as one, and properly retaining the ball-bearings F between the cone and adjacent cup E. It will be noticed that the tenon J² is seated in the mortise K′ beyond the inner terminal of the bifurcation K, and so is incapable of lateral motion, thus strengthening the connection of the sections at the division of the same adjacent to the joint formed by said bifurcation and tenon. The cone G has the peripheral flange N thereon, the same closing the end of the box D, whereby the latter is guarded against the introduction of dirt, dust, &c. The opposite end of the shaft is screw-threaded for the engagement of the threaded sprocket-center B′ and also for the threaded opening of the cone G′, whereby the latter may be adjusted in relation to the ball-bearings F. The cone G′ is provided with a peripheral flange Q, which prevents the entrance of dirt, dust, &c., into the box D at the relative end thereof, the flanges N and Q of the cones being located at the open ends of the box D, so as to freely close the same.

P P designate retainers for the sides of the ball-bearings, the same being of annular form, so as to encircle said bearings without interfering with the freedom of motion thereof.

Q′ Q′ designate washers which are interposed, respectively, between the cone G′ and the sprocket-center and between the cone G and the nut M, said washers being prevented from rotation by having a portion of their inner diameters right-lined or flat and engaging with similar-shaped portions of the shaft A. (See Fig. 5.)

It will be seen that when the nut M is unscrewed the cone G is accessible, and the same may also be unscrewed, both actions being in outward direction, whereby the joint of the sections H and J is uncovered and said sections may be separated, permitting the section J, with its connected parts, to be removed at one end of the box D and the section H, with its connected parts, at the other end thereof, it being also evident that the parts may be reassembled or restored to position and properly connected and the device is ready for operation.

Owing to the ball-bearings provided, the shaft A is adapted to rotate easily and steadily, the effect of which upon the operation of the pedals and propulsion of the bicycle or other vehicle is apparent.

Having thus described our invention, what we claim as new, and desire to secure by Letters Patent, is—

The combination with a crank-hanger, of a sectional shaft, each section thereof having a pedal-arm, a cone and ball-bearings thereon, the inner end of one section having a longitudinally-extending bifurcation and a mortise, the latter continuous of the opening of said bifurcation, and the inner end of the other section having a longitudinally-extending tongue and tenon, the surfaces of the bifurcation and tongue being coincidently screw-threaded, and engaged by the cone thereon, said tenon entering said mortise in the respective section beyond the bases of said bifurcation and tongue.

HENRY M. KOLB.
CHARLES FOEHL.

Witnesses:
  JOHN A. WIEDERSHEIM,
  WM. C. WIEDERSHEIM.